US010815935B2

(12) United States Patent
Renaud et al.

(10) Patent No.: US 10,815,935 B2
(45) Date of Patent: Oct. 27, 2020

(54) THROTTLEABLE PROPULSION LAUNCH ESCAPE SYSTEMS AND DEVICES

(71) Applicants: Earl W. Renaud, Ottawa (CA); Patrick R. E. Bahn, Washington, DC (US)

(72) Inventors: Earl W. Renaud, Ottawa (CA); Patrick R. E. Bahn, Washington, DC (US)

(73) Assignee: TGV Rocket, Inc., Washington, DC (US)

( * ) Notice: Subject to any disclaimer, the term of this patent is extended or adjusted under 35 U.S.C. 154(b) by 238 days.

(21) Appl. No.: 15/729,554

(22) Filed: Oct. 10, 2017

(65) Prior Publication Data
US 2018/0030929 A1 Feb. 1, 2018

Related U.S. Application Data

(63) Continuation of application No. 13/590,181, filed on Aug. 20, 2012, now abandoned.
(Continued)

(51) Int. Cl.
F02K 9/60 (2006.01)
B64G 1/40 (2006.01)
B64G 1/52 (2006.01)
F02K 9/08 (2006.01)
F02K 9/46 (2006.01)
F02K 9/72 (2006.01)
B64G 1/00 (2006.01)
F02K 9/96 (2006.01)

(52) U.S. Cl.
CPC ............. F02K 9/605 (2013.01); B64G 1/002 (2013.01); B64G 1/40 (2013.01); B64G 1/52 (2013.01); F02K 9/08 (2013.01); F02K 9/46 (2013.01); F02K 9/72 (2013.01); F02K 9/96 (2013.01); F05D 2220/80 (2013.01); Y10T 29/49346 (2015.01)

(58) Field of Classification Search
CPC ... F02K 9/60; F02K 9/80; F02K 9/805; F02K 9/82; F02K 9/84; F02K 9/86; F02K 9/88; F02K 9/90; F02K 9/92; F02K 9/97; F02K 9/972; F02K 9/974; F02K 9/976; F02K 9/978; F02K 1/48; F02K 9/605
See application file for complete search history.

(56) References Cited

U.S. PATENT DOCUMENTS 3,443,757 A * 5/1969 Townend .............. B64D 33/04
                                                    239/265.11
4,351,479 A * 9/1982 Kranz et al. ........... B64C 15/10
                                                    239/265.23
5,265,807 A * 11/1993 Steckbeck et al. ....... F02K 1/46
                                                    239/265.11

OTHER PUBLICATIONS

NASA "Nozzle Design" (Year: 2009).*

* cited by examiner

Primary Examiner — Scott J Walthour
Assistant Examiner — William L Breazeal

(57) ABSTRACT

The present invention relates to throttleable propulsion launch escape systems and devices. In one embodiment, the system includes a tower and at least one throttleable motor secured to the tower. The throttleable motor is able to throttle to a reduced power setting during flight. In another embodiment, the system includes at least one throttleable motor and a space vehicle unit that includes a containing structure. In a further embodiment, the throttleable motor may be secured about a boost escape system of a space vehicle unit. In an additional embodiment, the present invention is a three-dimensional nozzle.

7 Claims, 13 Drawing Sheets

Related U.S. Application Data

(60) Provisional application No. 61/575,258, filed on Aug. 18, 2011.

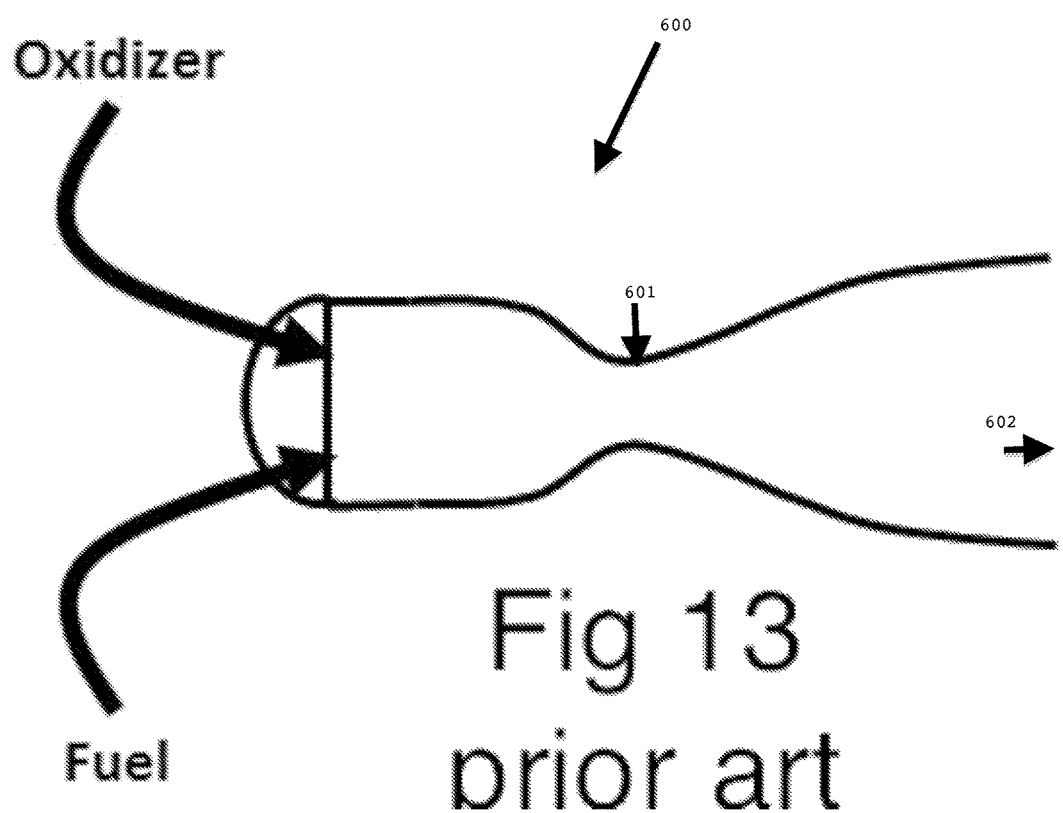

THROTTLEABLE PROPULSION LAUNCH ESCAPE SYSTEMS AND DEVICES

CROSS-REFERENCE TO RELATED APPLICATION

The present application is a continuation of U.S. patent application Ser. No. 13/590,181, filed Aug. 20, 2012, and published as U.S. Patent Application Publication No. 2013/0043352, which claims the priority benefit of U.S. Provisional Patent Application Ser. No. 61/575,258, filed Aug. 18, 2011, both of which are incorporated herein by reference in its entirety.

FIELD OF THE INVENTION

The present invention relates generally to rockets, space transportation vehicles, launch vehicles and systems, crew escape vehicles and systems, launch escape towers, and space vehicle systems and devices. More specifically, the present invention relates to throttleable propulsion launch escape systems and devices.

BACKGROUND OF THE INVENTION

Rockets, space transportation vehicles, launch vehicles and systems, crew escape vehicles and systems, launch escape towers, and space vehicle systems and devices are known in the art. The following patent documents below disclose and show some of these examples.

U.S. Pat. No. 3,001,739, issued to Faget et al. on Sep. 26, 1961, discloses a space capsule having a blunt forebody, a narrow afterbody and a top cylindrical container is shown as being positioned atop a launching vehicle, such for example as a rocket or missile motor, by means of an adapter pedestal secured to the nose portion of the launching vehicle. The capsule is detachably seated upon the pedestal by a circumscribing split ring having one or more explosive bolts connected between segments of the split clamp ring. Mounted atop the capsule container is the emergency separation unit of the present invention. The unit consists of separate rocket motors and supported by a tower. The base of the tower is detachably secured to the capsule container by a clamp ring having one or more explosive bolts normally maintaining the segments thereof in a continuous ring. The rocket motor is of a size suitable to rapidly lift the capsule a predetermined safe separation distance from the launching motor in the event of an impending failure thereof. A preferred rocket motor design would provide for a separation distance of approximately 250 feet during the first second of rocket motor operation. The rocket motor is provided with three nozzles which nozzles are equidistantly spaced and suitably canted so as to direct the rocket blast outward and away from the tower and capsule. The rocket motor is positioned under rocket motor and is of a suitable size to effect jettisoning of the separation unit, as will be more fully explained hereinafter. A ballast is positioned on the rocket motor for maintaining the capsule statically stable and trim in the same attitude as the capsule would maintain during a normal launching. An aerodynamic spike may be vertically disposed atop the ballast for developing a shock wave which will reduce the heating of the capsule by aerodynamic friction during the launching flight period.

U.S. Pat. No. 3,576,298, issued to Barnett et al. on Apr. 27, 1971, discloses an aerospace vehicle is described comprising a substantially conical forward crew compartment or command module mated to a substantially cylindrical rearward service module. Aerodynamic fairings are provided along the midline on the sides of the cylindrical portion and a substantial distance aft thereof for providing lift at hypersonic velocities and approximately vertical fins are provided on the fairings for aerodynamic stability and control. Wings are mounted within the aerodynamic fairings at high velocities and pivotably extended therefrom at lower velocities and altitudes to provide low speed lift. Upon reentry into the earth's atmosphere hypersonic lift is provided by the body and the fairings for bringing the vehicle to the area of a selected landing site and, at lower flight speeds deeper into the atmosphere, augmented lift is provided by the extended wings for landing the vehicle on a conventional runway. A rocket engine for propulsion has a large expansion ratio bell for use in the vacuum of space. The large ratio bell is jettisonable to give a low expansion ratio for use of the same engine within the atmosphere. Rear landing skids are pivotable into and out of the wake of the vehicle to reduce the requirement for heat shielding. Similarly, reaction control rocket motors are also pivotable into and out of the wake of the vehicle for minimizing heat protection requirements. Such a vehicle is readily adaptable to a broad variety of space missions such as cargo ferry or satellite recovery, and is reuseable with minimum refurbishment.

U.S. Pat. No. 3,999,728, issued to Zimmer on Dec. 28, 1976, discloses an escape capsule integrally designed within a parent aircraft and having a fly-away capability throughout the entire speed range of the parent aircraft. The capsule utilizes segments of the leading edges of the aircraft wings to provide flight capability and stabilization to the capsule, an elevon system controlling the capsule about both its lateral and longitudinal axes, and rudder and vertical stabilizing elements for controlling the capsule about its vertical axis. A rocket is provided to supply the thrust necessary to accomplish positive separation of the capsule from the parent aircraft along a required trajectory. A thrust system, such as a turbojet or fan jet engine, is provided for sustaining the capsule in flight.

U.S. Pat. No. 4,887,780, issued to Goodrich et al. on Dec. 19, 1989, discloses an orbiter escape pole. A shuttle type of aircraft with an escape hatch has an arcuately shaped pole housing attachable to an interior wall and ceiling with its open end adjacent to the escape hatch. The crew escape mechanism includes a magazine and a number of lanyards, each lanyard being mounted by a roller loop over the primary pole member. The strap on the roller loop has stitching for controlled release, a protection sheath to prevent tangling and a hook member for attachment to a crew harness.

U.S. Pat. No. 5,143,327, issued to Martin on Sep. 1, 1992, discloses a heavy launch vehicle for placing a payload into a spatial Earth orbit including an expendable, multi-container, propellant tank having a plurality of winged booster propulsion modules releasably disposed about one end thereof; and a payload supported by adapter structure at the other end. The preferred payload is an entry module adapted to be docked to a space station and used as a return vehicle for the space station crew, as scheduled, or in emergency situations. Alternately, the payload may include communication satellites, supplies, equipment and/or structural elements for the space station. The winged propulsion modules are released from the expendable propellant tank in pairs and return to Earth in a controlled glide, for safe landing at or near the launch site and prepared for reuse. The rocket engines for each propulsion module are dual-fuel, dual-mode engines and use methane-oxygen and hydrogen-oxygen, respectively, from the multi-containers of the propellant tank. When the propulsion modules are released from the expendable propellant tank, the rocket engines are pivotally moved into the module cargo bay for the return glide flight.

U.S. Pat. No. 5,526,999, issued to Meston on Jun. 18, 1996, discloses a spacecraft with a crew escape system. The spacecraft comprises a fuselage, a wing, a power unit incorporating two liquid-propellant launching rocket engines, two liquid-propellant boost rocket engines, six transverse-thrust rocket engines located in the spacecraft fuselage on a rotatable ring, solid-propellant emergency deceleration rocket engines, and solid-propellant additional boosting rocket engines, a payload compartment, a crew compartment, a tail unit with two vertical fin struts, a bottom tailplane, and a top tailplane. The fuselage is provided with a movable center conical body. The spacecraft landing gear has a swivelling tail wheel. The crew compartment is interposed between the fin struts under the top tailplane. The spacecraft is provided with an orbital maneuvering system whose final control elements are in fact low-thrust rocket engines, and gyrodynes. The crew escape system comprises an escape module which is in fact a recoverable ballistic capsule held to the end face of the tail portion of the fuselage. The capsule communicates with the crew compartment through a tunnel provided with means for crew transfer from the crew compartment to the capsule. The capsule has a front and a rear hatch, an aerodynamic decelerator, and a parachute system. The front portion of the capsule has a heat-protective coating. The center of mass of the capsule is displaced towards its front portion.

U.S. Pat. No. 5,572,864, issued to Jones on Nov. 12, 1996, discloses a solid-fuel, liquid oxidizer hybrid rocket turbopump auxiliary engine. A propulsion thruster includes a solid-fuel, liquid-oxidizer main rocket engine, a tank of liquid oxygen, and a turbine-driven pump for pumping liquid oxygen to the main engine. A solid-fuel, liquid-oxidizer auxiliary engine has its oxidizer input port coupled to the output of the turbopump, for generating drive fluids for the turbine of the turbopump. The temperature of the turbine drive fluids is reduced to prevent damage to the turbine, and the mass flow rate is increased, by injecting water from a tank into the drive fluids at the output of the auxiliary engine. Starting is enhanced by preventing cooling of the solid fuel by the liquid oxidizer, which is accomplished by applying gaseous oxygen from a tank to the oxidizer input port of the auxiliary engine.

U.S. Pat. No. 6,629,673, issued to Casillas et al. on Oct. 7, 2003, discloses an adaptable solid-hybrid rocket for crew escape and orbital injection propulsion. The invention relates to a propulsion system for transporting a crew transfer vehicle. The propulsion system has a casing which defines a chamber, a solid propellant system positioned within the chamber for generating one of emergency escape propulsion during an emergency portion of an ascent flight and orbital injection propulsion during normal flight operations, and a sustain propulsion system communicating with the chamber for sustaining one of the emergency escape propulsion during the emergency portion of the ascent flight and orbital injection propulsion during the normal flight operations. In one embodiment of the invention, the sustain propulsion system comprises a hybrid solid fuel grain and liquid oxidizer system. In a second embodiment of the invention, the secondary propulsion system comprises a liquid fuel and liquid oxidizer system.

U.S. Pat. No. 7,484,692, issued to McKinney et al. on Feb. 3, 2009, discloses an integrated abort rocket and orbital propulsion system. An orbital stage system has an orbital stage and one or more launch stages. The orbital stage incorporates an orbital maneuvering system (OMS) and an abort propulsion system which both utilize the same propellants, propellant tankage, and propellant pressurization system, but which employ radically different engines. The OMS engines are comprised of at least two engines which have a combined thrust in the neighborhood of 1/10 the weight of the orbital stage, an area ratio of 50 or more and an operating life of many hundred seconds, preferably many thousands of seconds or more. The abort engine may be a single engine and typically has a thrust of three, four, or more times the weight of the vehicle and an area ratio in the neighborhood of two and an operating life of at most a few tens of seconds.

U.S. Patent Application No. 2007/0012821, published to Buehler on Jan. 18, 2007, discloses that a launch vehicle upper-stage escape system allows a crew capsule or a payload capsule to be safely and rapidly separated from a launch vehicle in the event of an emergency using the upper stage main engine for propulsion. During the initial portion of the flight the majority of the propellant mass for the upper stage is stored in the lower stage. This minimizes the mass of the upper stage allowing the upper stage main engine to provide sufficient acceleration to lift the capsule off of the launch vehicle and to move the capsule away from the launch vehicle to a safe distance with sufficient speed in the event of an emergency. It can also be used to lift the crew or payload capsule to a sufficient height for recovery systems to be employed successfully in the event of an on-pad or low-altitude launch emergency.

U.S. Patent Application No. 2008/0265099, published to Camarda et al. on Oct. 30, 2008, discloses an annular fairing having aerodynamic, thermal, structural and acoustic attributes that couples a launch abort motor to a space vehicle having a payload of concern mounted on top of a rocket propulsion system. A first end of the annular fairing is fixedly attached to the launch abort motor while a second end of the annular fairing is attached in a releasable fashion to an aft region of the payload. The annular fairing increases in diameter between its first and second ends.

U.S. Patent Application No. 2009/0211258, published to Bulman on Aug. 27, 2009, discloses that improved rocket nozzle designs for vehicles with nozzles embedded in or protruding from surfaces remote from the desired thrust axis. The nozzle configurations are for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle. These unconventional nozzle shapes improve vehicle performance.

WIPO Application No. WO 2008/105967 A2, published to Raytheon Company on Sep. 4, 2008, discloses a propulsion system that includes a canted multinozzle plate, which has a multitude of small nozzles angled (not perpendicular) to major surfaces of the multinozzle grid plate. The multinozzle plate may be a cylindrical section or plate, and the multitude of nozzles may be substantially axisymmetric about the cylindrical plate. The propulsion system includes a pressurized gas source which may be placed either forward or aft of the multinozzle grid plate. The propulsion system may have a conical insert, an internal flow separator cone, to aid in changing directions of flow from the pressurized gas source, to divert the flow through the multiple nozzles.

U.S. Pat. No. 6,457,306, issued to Abel, et al. on Oct. 1, 2002, discloses a liquid propellant supply system being electrical in nature and avoids the need for a gas generator and a turbine assembly. In particular, the system includes an electrical power source, a controller and a motor for driving the pump.

U.S. Pat. No. 7,762,498, issued to Henderson, et al. on Jul. 27, 2010, discloses a high-efficiency spacecraft propulsion system, including includes electric pumps inserted in the oxidizer and fuel lines that increase liquid apogee engine ("LAE") operating pressure and reduce tank-operating pressure. An on-board computer generates pump drive signals, in response to measured oxidizer and fuel line pressures, that are input to the pump controller electronics.

U.S. Patent Application No. 2011/0017873A1, published to Raymond on Jan. 27, 2011, discloses an apparatus for driving a pump for fueling a rocket engine of a space vehicle. The apparatus comprises an inertia wheel and a transmitting device to transmit a rotation of the inertia wheel to the pump. The apparatus further comprises a measuring device to measure the rotation speed of the inertia wheel a clutching device to decouple the wheel and the pump for a speed lower than a pre-determined speed lower, which is lower than the nominal rotation speed of the wheel. The invention is particularly applicable to a space vehicle comprising a rocket engine wherein the fuel supply system comprises at least one pump driven by the apparatus of the invention and a starting device to start the apparatus while the space vehicle is in flight.

U.S. Patent Application No. 2009/0293448A1, published to Grote, et al. on Dec. 3, 2009, discloses a rocket engine for use in space transport industry, includes recirculating cooling system coupled to gap between inner and outer shells, in at least two locations, to recirculate convective coolant through gap. The pump of propulsion system is a centrifugal pump driven by an electric motor.

U.S. Pat. No. 5,407,331, issued to Atsumi on Apr. 18, 1995, discloses a motorised vehicle fuel pump that has inner rotating wheel on bearing with magnet on bearing which is lubricated and cooled by fuel.

U.S. Pat. No. 5,636,512, issued to Culver on Jun. 10, 1997, discloses a nuclear thermal rocket engine for space missions that comprises auxiliary feed apparatus coupled to primary feed apparatus, and operatable in zero, low and high thrust modes.

U.S. Pat. No. 5,475,722, issued to Culver on Dec. 12, 1995, discloses a nuclear thermal rocket engine that comprises nuclear reactor core with multiple fuel assemblies, reflector assembly surrounding core, vessel housing reflector and core, etc. To help start pumps, an electric pump is positioned along an alternative flow path between main tank and pumps. Electric pump initially draws hydrogen from main tank to start the flow of hydrogen through pumps. Once pumps begin running, electric pump is turned off and the hydrogen flows through valves. Electric pump can also be used as a back-up pump if a mechanical problem occurs or for low thrust operation during flight.

U.S. Pat. No. 7,104,507, issued to Knight on Sep. 12, 2006, discloses a manned rocket for space tourism that has air-breathing external combustion rocket engine with fuel tank configured to contain fuel combustible with air, where combustor is connected to fuel tank.

U.S. Pat. No. 3,021,671, issued to Wallach on Feb. 20, 1962, discloses a rocket engine, consisting in principle of a combustion chamber which is rear to front charged, an appliance chamber containing an electric motor, two high-pressure reciprocal pumps, two air-traps and an electric battery or batteries; further it consists of a liquid fuel and oxidizer compartment, such liquid fuel and oxidizer compartments being interconnected with the rear of the combustion chamber by means of suitable ducts, and such ducts interposed with appropriate artifices such as a reciprocal pump and an airtrap.

U.S. Pat. No. 3,017,745, issued to Shirley, et al. on Jan. 23, 1962, discloses a pressure responsive switch, comprising a diaphragm associated with electrical contacts, is also connected to the main hydrogen peroxide supply line between the hydrogen peroxide pump and the on/off valve referred to, and this switch is arranged to interrupt the power supply to the electric motor driving the starter pump when the pressure of hydrogen peroxide in the main supply line reaches a predetermined value which is sufficient to provide oxygen and superheated steam to drive the turbine.

U.S. Pat. No. 3,516,251, issued to Andrews, et al. on Jun. 23, 1970, discloses that instead of driving the pumps by the turbine, they may be driven by an electric motor.

U.S. Pat. No. 5,636,509, issued to Abel on Jun. 10, 1997, discloses a heat and pressure energy conservation rocket powered flywheel engine that has non-radial propulsion units for generating thrust having drive shaft mounting for rotation and heat conservation unit for reclaiming heat energy. Stored electrical energy from the battery may be used to drive electrical systems that may include electric motors used to power starters or rocket igniters or other systems associated with the engine and vehicle.

U.S. Patent Application No. 2003/0010013A1, published to Johnstone on Jan. 16, 2003, discloses a catalytic turbine in electric power generation system that has rocket engines that produce steam exhaust without toxins, by combustion of hydrogen produced by reaction of water with metal hydride. The fuel preferably is fed to the system initially by a manual pump, or by an electric pumping system. Once the rotor assembly begins to turn, however, a mechanical or electric pump connected to a drive link on the rotor assembly can draw the fuel from the tank to the tip of the impeller blades in the rotor assembly.

U.S. Pat. No. 6,371,740, issued to Jansen on Apr. 16, 2002, discloses a combustible fuel supply system for gas turbine, rocket or jet engine, that includes fuel metering pump which provides constant pressure fuel to fuel consumption device without using accumulator metering valve.

U.S. Patent Application No. 2011/0017874A1, published to Haase on Jan. 27, 2011, discloses a storing method for fuel, e.g. hydrogen and oxidizer, such as oxygen, in space ship, space vessel and non-earth body. Involves performing heat rejection from a liquid flow through radiation and/or heat exchange with heat rejection fluid.

U.S. Pat. No. 5,043,617, issued to Rostron on Aug. 27, 1991, discloses a drive system for pump-compressor that includes several motors, each operating at 12 V and drawing current not greater than 350 mA at 2.5 W.

U.S. Patent Application No. 2010/0252686A1, published to Raymond, et al. on Oct. 7, 2010, discloses a supply pump motorizing device for rocket engine of space plane that has aerobic type internal combustion engine supplied with oxidant and fuel through fuel and oxidant tanks, where fuel and oxidant tanks are independent from propellant tank.

U.S. Pat. No. 5,607,123, issued to Larsen on Mar. 4, 1997, discloses a thrust-vectoring system for rocket nozzles that has force attenuator in order to limit transient loads which nozzle and associated structure experience.

The Applicant is unaware of inventions or patents, taken either singly or in combination, which are seen to describe the instant invention as claimed.

SUMMARY OF THE INVENTION

The present invention relates to throttleable propulsion launch escape systems and devices.

In a first embodiment of the present invention, a throttleable propulsion launch escape system (TPLES) includes a tower and at least one throttleable motor or engine being secured or attached to the tower. The TPLES of this embodiment may further include at least one of the following: a propellant source, a propellant pressurizing source, at least one instrumentation device, and a space vehicle unit that includes a containing structure.

The tower includes a first end and a second end. Preferably, the tower also includes an elongated body extending between the first end and second end, and an attachment structure or base located at the second end. As a non-limiting example, an instrument unit, a guidance, navigation and control (G, N and C) unit, a propellant source, and a propellant pressurizing source, may be secured or attached to, and/or contained within, the frame of the tower.

The throttleable motor or engine is able to throttle to a reduced power setting during flight. Preferably, the throttleable motor is able to throttle and is operated at a reduced power setting during powered flight.

The space vehicle unit includes a containing structure. The space vehicle unit may also include a first end, a second end, a boost protective cover, shroud or fairing, a first stage unit or booster, at least one first stage unit motor or engine, a second stage unit or booster, at least one second stage unit motor or engine, at least one containing structure motor or engine, a service module, and an interstage unit, ring or support structure. The containing structure includes a top, a bottom, and a body extending between the top and bottom. The body has a periphery. The containing structure may be a crew containing structure, a payload containing structure, or a combination thereof. Preferably, the tower is detachably or releasably secured or attached to the space vehicle unit. With respect to vertical alignment relative to a launch pad or the ground prior to launch, it is preferred that the tower is positioned above the space vehicle unit and containing structure.

In use, it is preferred that the tower, at least one throttleable motor, fairing, and other components of the space vehicle unit are releasably jettisoned from the containing structure, containing structure motor or engine, and service module when a predetermined altitude is reached during a flight.

In another embodiment, the TPLES includes a space vehicle unit that includes a containing structure, and at least one throttleable motor or engine being detachably or releasably secured or attached about, proximate or to a periphery of a body of the containing structure. The TPLES of this embodiment may further include at least one of the following: a propellant source, a propellant pressurizing source, and at least one instrumentation device.

In use, it is preferred that at least one throttleable motor, fairing, and other components of the space vehicle unit are releasably jettisoned from the containing structure, containing structure motor or engine, and service module when a predetermined altitude is reached during a flight.

In a further embodiment, the TPLES includes a space vehicle unit that includes a containing structure, and at least one throttleable motor or engine being detachably or releasably secured or attached about, proximate or to a boost escape system located below the containing structure. The TPLES of this embodiment may further include at least one of the following: a propellant source, a propellant pressurizing source, and at least one instrumentation device.

In use, it is preferred that at least one throttleable motor, fairing, and other components of the space vehicle unit are releasably jettisoned from the containing structure, containing structure motor or engine, service module, and boost escape system when a predetermined altitude is reached during a flight.

A further embodiment of the present invention is a three-dimensional (3-D) nozzle.

BRIEF DESCRIPTION OF THE DRAWINGS

FIG. 13 is a plan view of a prior art laval nozzle on a rocket engine.

It should be understood that the above-attached figures are not intended to limit the scope of the present invention in any way.

DETAILED DESCRIPTION OF THE PREFERRED EMBODIMENTS

The present invention relates to throttleable propulsion launch escape systems and devices.

The first embodiment is a throttleable propulsion launch escape system (TPLES), which is indicated generally by the numerals 100, 200, 300.

Referring to FIGS. 1-4, the TPLES 100 includes a tower 120 and at least one throttleable motor or engine 170 being secured or attached to the tower 120. The TPLES 100 of this embodiment may further include at least one of the following: a propellant source, a propellant pressurizing source, at least one instrumentation and guidance device 140, 150, and a space vehicle unit (or booster) 180 that includes a containing structure (or capsule) 190.

Figure 1:
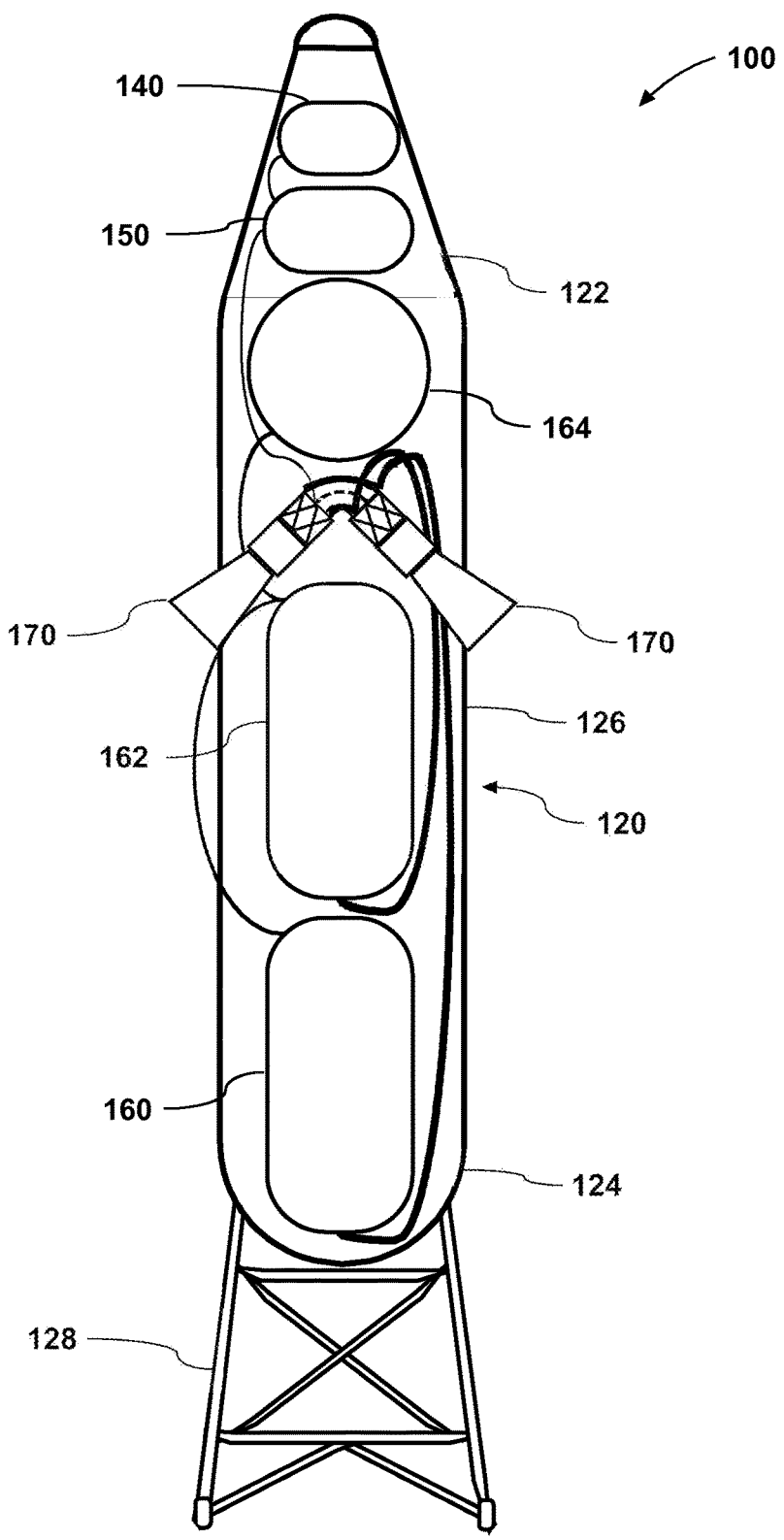
FIG. 1 is a schematic, cut-away view of a first embodiment of a throttleable propulsion launch escape system according to the present invention, showing examples of internal devices and components being secured or attached to, and/or contained within, a frame of a tower of the system.

The tower 120 includes a first end 122 and a second end 124. Preferably, the tower 120 also includes an elongated body 126 extending between the first end 122 and second end 124, and an attachment structure or base 128 located at the second end 124. Preferably, the first end 122 has a generally pointed nose or tip, and the attachment structure or base 128 can be detachably or releasably secured or attached to a space vehicle unit 180 by any method known to one of ordinary skill in the art. As a non-limiting example and as best shown in FIG. 1, an instrument unit 140, a guidance, navigation and control (G, N and C) unit 150, a propellant source contained within tanks 160, 162, and a propellant pressurizing source contained within tank 164, are secured or attached to, and/or contained within, the frame of the tower 120.

The instrument unit 140 preferably measures, as non-limiting examples, the barometric pressure, angle of attack, electronic altitude, dynamic pressure, electronic velocity, and acceleration.

The G, N and C unit 150 preferably calculates, as non-limiting examples, the preferred escape angle, velocity, closed loop throttle control, and automatic abort criteria.

The propellant source is in operative communication with the throttleable motor 170, and helps to launch a space vehicle, which includes the TPLES 100 of this embodiment and space vehicle unit 180, into space. The propellant source preferably includes a fuel source and an oxidizer source. The propellant source may also include any other propellant that is known to one of ordinary skill in the art. The fuel source is preferably contained within a fuel tank 160, and, as a non-limiting example, may be a mono-propellant fuel. The fuel source may be a liquid fuel, a solid fuel, a gaseous fuel, and any combination thereof. The fuel source may also be any other type of fuel that is known to one of ordinary skill in the art. Preferably, the fuel source is a liquid fuel, such as, but not limited to, monomethyl hydrazine (MMH), kerosene, methane, propane, ammonia, and pentaborane. This is because a solid fuel, such as, but not limited to, butadyne mixed with aluminum and perchlorate, is more difficult to throttle or pump without being finely powdered and suspended in a transport fluid. The oxidizer source is preferably contained within an oxidizer tank 162, and, as a non-limiting example, may be a mono-propellant oxidizer, such as hydrogen peroxide. The oxidizer source may be a liquid oxidizer, a solid oxidizer, a gaseous oxidizer, and any combination thereof. The oxidizer source may also be any other type of oxidizer that is known to one of ordinary skill in the art. Preferably, the oxidizer source is a liquid oxidizer, such as, but not limited to, nitrogen tetroxide (NTO), hydrogen peroxide, liquid oxygen, nitrous oxide, and nitric acid. As a non-limiting example, when a space vehicle relating to this embodiment uses a liquid fuel or a combination or hybrid liquid-solid fuel, the space vehicle will preferably also use a liquid oxidizer or a combination or hybrid liquid-gas oxidizer, respectively.

The propellant pressurizing source is preferably contained within a propellant pressurizing tank 164. The pressurizing source pressurizes the fuel tank 160 and oxidizer tank 162. Preferably, the pressurizing source is a non-reactive gas, such as, but not limited to, helium, argon, neon, and nitrogen.

The throttleable motor or engine 170 is able to throttle to a reduced power setting during flight. As an example, the reduced power setting is within a range from about 1% to about 50% power of a normal power setting. As another example, the reduced power setting is within a range from about 1% to about 30% power of a normal power setting. As an additional example, the reduced power setting is within a range from about 1% to about 11% power of a normal power setting. Preferably, the throttleable motor is able to throttle and is operated at a reduced power setting during powered flight. As non-limiting examples, the throttleable motor 170 may include one nozzle and one chamber, or a plurality of nozzles and one chamber.

As one non-limiting example, the throttleable motor 170 is comprised of a chamber supplied with a propellant combination with active or passive cooling in the chamber and nozzle. Active cooling may be accomplished by film cooled, duct cooled, regeneratively cooled, or transpiration cooled, and passive cooling may be accomplished by either an ablative material or a high temperature radiative material. The chamber has either an adjustable pintle injector with face shut off or internal valves, a showerhead injector with variable port geometry, or a rigid screen mesh through which propellant is introduced and dispersed in the chamber. The throttleable motor 170 has a throat of sufficient size to constrict the combustion products and force flow of about mach one speed at the nozzle's narrowest part and force flow above supersonic speed in the diverging nozzle. The pintle injector may be described as a pipe within a pipe where two separate propellants may be supplied and caused to mix at the end point at an extreme convergence angle. The showerhead injector may be described as a plate with many ports, or holes drilled in it, where the ports are supplied with propellants which mix after exiting the ports. The rigid screen mesh injector may be described as layers of a perforated material placed in layers with propellants introduced from one side and then the propellants disperse and mix while travelling through the mesh.

As another non-limiting example, the throttleable motor 170 is a 60,000 lbf pressure fed, deep throttling, fully reusable, NTO-MMH pintle motor with 2.25 factor of safety. The throttleable motor 170 may use NTO for an oxidizer, MMH as a fuel, and helium to pressurize the propellant tanks. The throttleable motor 170 may use a combination of ablator and film cooling to reduce costs and reduce risk. The throttleable motor 170 can throttle from 10% to 100% of full thrust while maintaining stable combustion. As a non-limiting example, throttle allows converting 8,000 lbs of penalty mass into 1,000 lbs plus of LEO cargo.

Figure 2:
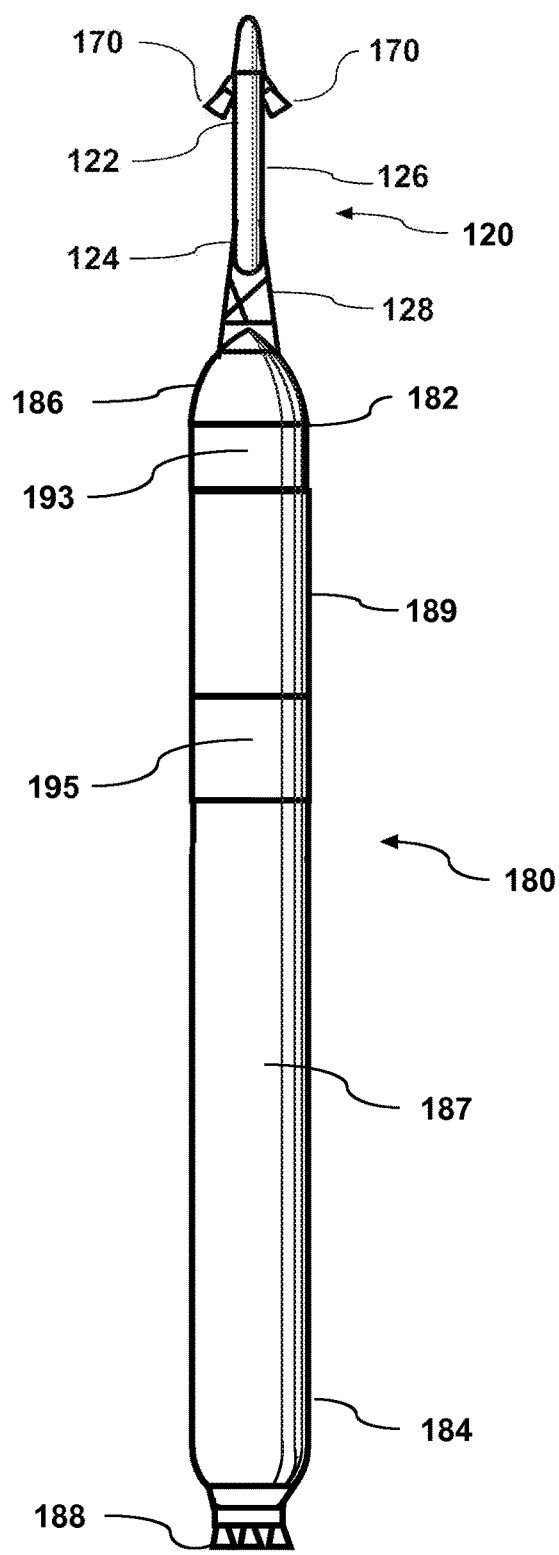
FIG. 2 is a front, perspective view of the throttleable propulsion launch escape system of FIG. 1, showing the tower of the system being secured or attached to a fairing of a space vehicle unit.
Figure 4:
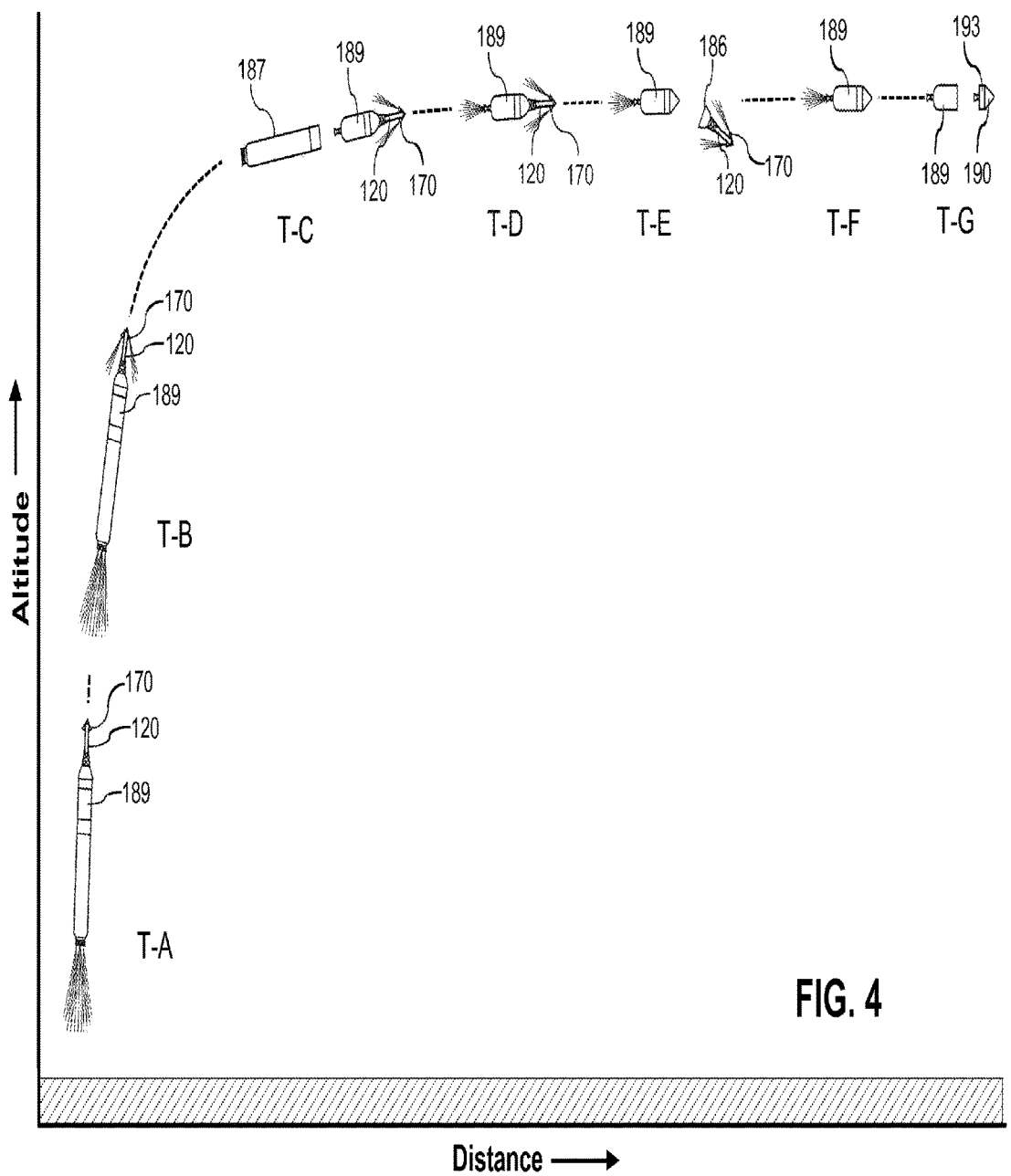
FIG. 4 is a schematic review of a timeline, showing different stages of a launch, a flight, and a jettisoning of devices and components, of the throttleable propulsion launch escape system of FIG. 2.
Figure 5:
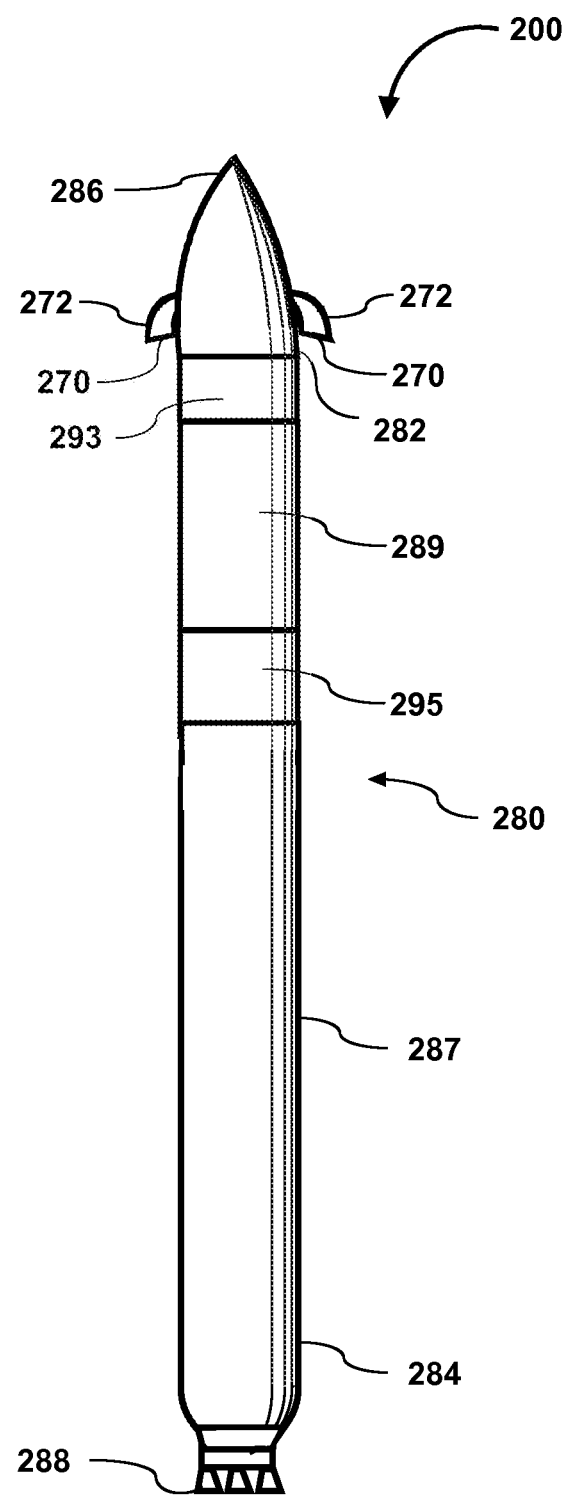
FIG. 5 is a front, perspective view of a second embodiment of the throttleable propulsion launch escape system according to the present invention.
Figure 6A:
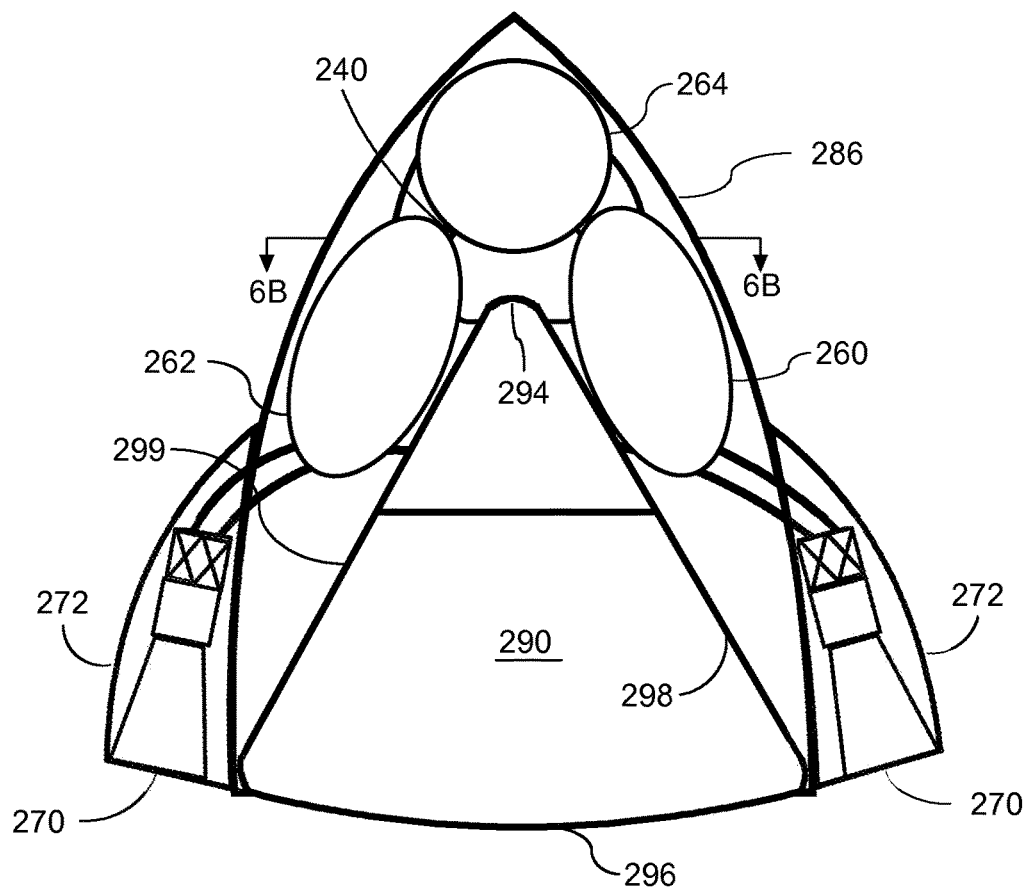
FIG. 6A is a schematic, cut-away view, from top to bottom, of a fairing and containing structure of the throttleable propulsion launch escape system of FIG. 5, showing examples of internal devices and components being secured or attached to, and/or contained within, the fairing.
Figure 6B:
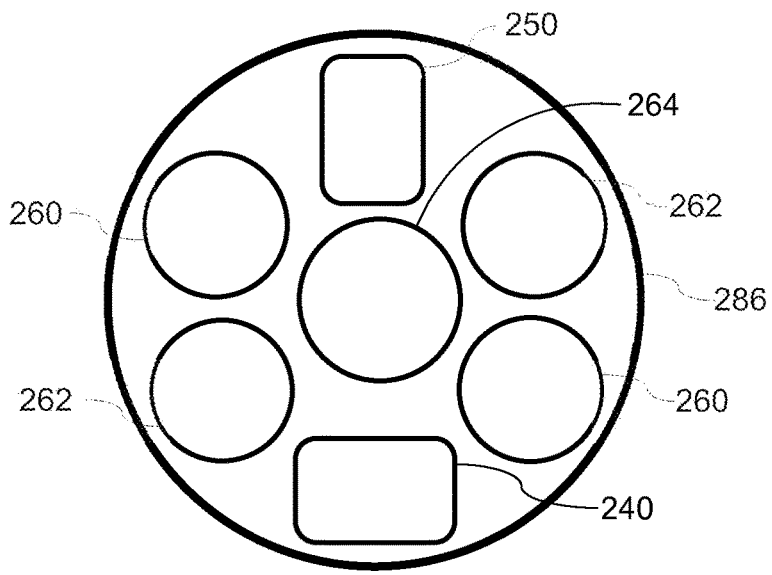
FIG. 6B is a schematic, cross-sectional view of the fairing of the throttleable propulsion launch escape system of FIG. 5, showing examples of internal devices and components being secured or attached to, and/or contained within, the fairing.

Referring to FIGS. 1, 2 and 4, the throttleable motor 170 is secured or attached to the tower 120 by any method known to one of ordinary skill in the art. When the TPLES 100 includes only one throttleable motor 170, it is preferred that the throttleable motor 170 is secured or attached about or toward the second end 124 of the tower 120. When the TPLES 100 includes a plurality of throttleable motors 170, it is preferred that the throttleable motors 170 are secured or attached about or toward the first end 122 of the tower 120. Preferably, each throttleable motor 170 is positioned at a predetermined angle such that the exhaust from the throttleable motor 170 does not make contact with, or makes minimum contact with, nor impinge a boost protective cover, shroud or fairing 186, or any surface of the space vehicle unit 180. Preferably, a plurality of throttleable motors 170 are included instead of just one throttleable motor 170 so that the load of the work is distributed among the throttleable motors 170 and there is backup if one or more throttleable motors 170 malfunction or does not work. It is preferred that the throttleable motors 170 are exactly the same or substantially similar to one another and provide substantially the same performance.

Figure 3:
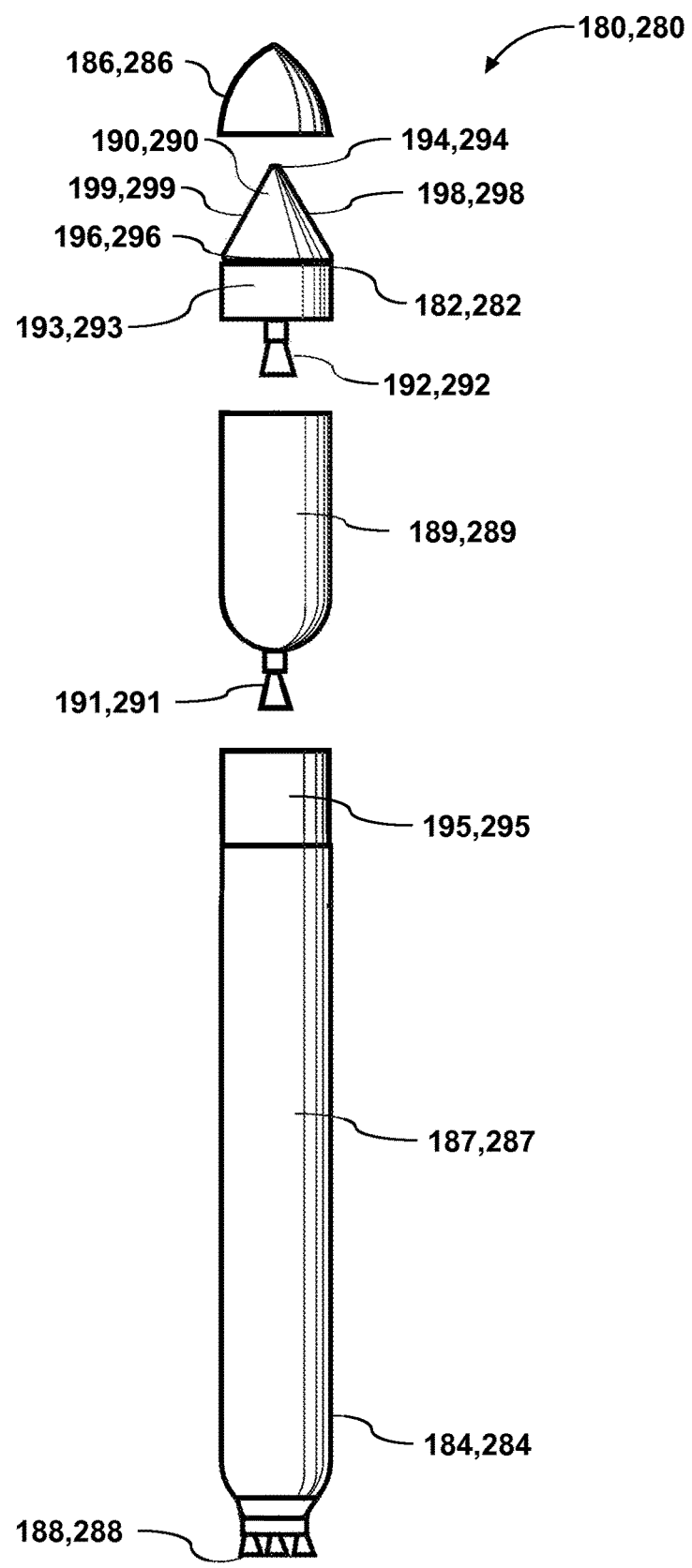
FIG. 3 is an exploded view of a space vehicle unit of the first and second embodiments of the throttleable propulsion launch escape system according to the present invention.

Referring to FIGS. 2-4, the space vehicle unit 180 includes a containing structure (or capsule) 190. As a non-limiting example, the space vehicle unit 180 also includes a first end 182, a second end 184, the boost protective cover, shroud or fairing 186, a first stage unit or booster 187, at least one first stage unit motor or engine 188, a second stage unit or booster 189, at least one second stage unit motor or engine 191, at least one containing structure motor or engine (or service propulsion motor or engine) 192, a service module 193, and an interstage unit, ring or support structure 195. It is preferred that the motors or engines 188, 191, 192 are exactly the same or substantially similar to the throttleable motors 170 and provide substantially the same performance. Alternatively, one or more of the motors or engines 188, 191, 192 may be any other type of motor or engine that is known to one of ordinary skill in the art.

As best shown in FIGS. 3 and 4, the containing structure 190 includes a top 194, a bottom 196, and a body 198 extending between the top 194 and bottom 196. The body 198 has a periphery 199. The containing structure 190 may be a crew containing structure, a payload containing structure, or a combination thereof. As a crew containing structure, the containing structure 190 is a pressurized container where the crew, and also passengers when applicable, stay in a life supporting atmosphere and control the flight of the space vehicle.

The fairing 186 preferably provides aerodynamic protection and thermal protection from the tower 120 and the outer atmosphere. When the throttleable motors 170, which are attached or secured to the tower 120, fires, hot gases are radiating at the containing structure 190. The fairing 186 is able to prevent the hot gases from burning holes in the containing structure 190. Also, the space vehicle may be flying at about mach 6 through the atmosphere, and this may impose serious atmospheric loads. The fairing 186 protects the containing structure 190 from those loads so the containing structure 190 does not get crushed.

The first stage unit or booster 187 preferably gets the second stage up through the atmosphere and up to a reasonable speed of about mach 3-6.

The first stage unit motors or engines 188 preferably are designed for atmospheric operation and for high thrust requirements.

The second stage unit or booster 189 preferably provides the major part of the energy needed to place the containing structure 190 and service module 193 in orbit.

The at least one second stage unit motor or engine 191 and the at least one containing structure motor or engine (or service propulsion motor or engine) 192 preferably are designed for in space orbit adjustment or de-orbit burn and assist in achieving orbital velocity.

The service module 193 preferably provides at least consumables, battery, electrical power, water, and propellants for in space maneuvering. The service module 193 may also provide altitude control, telemetry, and tracking communications equipment.

The interstage unit 195 preferably transfers mechanical loads from the first stage to the second stage, and allows power and communications wires from the first stage to the second stage.

Preferably, the tower 120 is detachably or releasably secured or attached by any means known to one of ordinary skill in the art to the space vehicle unit 180, such as to the fairing 186, such that the attachment structure or base 128 of the tower 120 is adjacent or in close proximity to the fairing 186. With respect to vertical alignment relative to a launch pad or the ground prior to launch, it is preferred that the tower 120 is positioned above the space vehicle unit 180 and containing structure 190.

In use and as shown in FIG. 4, it is preferred that the tower 120, one or more throttleable motors 170, fairing 186, first stage unit 187, motor 188, second stage unit 189, motor 191, and interstage unit 195 are releasably jettisoned from the containing structure 190, motor 192, and service module 193 when a predetermined altitude is reached during a flight (T-C, T-E). This is done because these devices and/or components are no longer needed or necessary for the rest of the flight trip, and releasing them from the containing structure 190, motor 192, and service module 193 helps, or may help, to reduce weight and save fuel and costs.

FIG. 4 shows a schematic review of a timeline, illustrating different stages of a launch, a flight, and a jettisoning of devices and/or components, of this embodiment of the throttleable propulsion launch escape system:

Time-0 (not shown): space vehicle stack, which includes fairing 186, first stage unit 187, motor 188, second stage unit 189, motor 191, containing structure 190, motor 192, service module 193, and interstage unit 195, and TPLES 100, which includes tower 120 and throttleable motors 170, is on the ground; Time-A: space vehicle stack is in powered flight; Time-B: space vehicle stack, with TPLES 100 at low power operation; Time-C: first stage unit 187, motor 188, and interstage unit 195 are separated from remaining space vehicle stack, with TPLES 100 at low power operation; Time-D: fairing 186, second stage unit 189, motor 191, containing structure 190, motor 192, service module 193, and TPLES 100 are flying, with TPLES 100 running at low power; Time-E: TPLES 100 and fairing 186 are jettisoned from remaining space vehicle stack of second stage unit 189, motor 191, containing structure 190, motor 192, and service module 193; Time-F: second stage unit 189, motor 191, containing structure 190, motor 192, and service module 193 are flying; and Time-G: second stage unit 189 and motor 191 are separated from containing structure 190, motor 192, and service module 193.

In another embodiment and referring to FIGS. 3 and 5-7, the TPLES 200 includes a space vehicle unit 280 that includes a containing structure 290, and at least one throttleable motor or engine 270 being detachably or releasably secured or attached about, proximate or to the periphery 299 of the body 298 of the containing structure 290. The TPLES 200 of this embodiment may further include one or more of the following: a propellant source and one or more instrumentation devices 240, 250.

When the TPLES 200 includes one or more throttleable motors 270, it is preferred that the throttleable motors 270 are detachably or releasably secured or attached about or toward the first end 282 of the space vehicle unit 280. In this embodiment, the throttleable motor 270 and engine fairing 272 are detachably or releasably secured or attached to the fairing 286 about the periphery 299 of the body 298 of the containing structure 290 by any method known to one of ordinary skill in the art. Preferably, each throttleable motor 270 is positioned at a predetermined angle such that the exhaust from the throttleable motor 270 does not make contact with, or makes minimum contact with, nor impinge the service module 293 or second stage unit 289, or any surface of the space vehicle unit 280.

Preferably, the instrument unit 240 of this embodiment is substantially similar to or exactly the same as the instrument unit 140 of the first embodiment as described above.

Preferably, the G, N and C unit 250 of this embodiment is substantially similar to or exactly the same as the G, N and C unit 150 of the first embodiment as described above.

Preferably, the propellant source, tanks 260, 262, and other related components of this embodiment are substantially similar to or exactly the same as the corresponding and respective propellant source, tanks 160, 162, and other related components of the first embodiment as described above.

Preferably, the propellant pressurizing source and propellant pressurizing tank 264 of this embodiment are substantially similar to or exactly the same as the corresponding and respective propellant pressurizing source and propellant pressurizing tank 164 of the first embodiment as described above.

Preferably, the throttleable motor or engine 270 of this embodiment is substantially similar to or exactly the same as the throttleable motor or engine 170 of the first embodiment as described above.

Preferably, the space vehicle unit 280 and its first end 282, second end 284, boost protective cover, shroud or fairing 286, first stage unit 287, at least one first stage unit motor or engine 288, second stage unit 289, at least one second stage unit motor or engine 291, at least one containing structure motor or engine 292, service module 293, and interstage unit 295 of this embodiment, are substantially similar to or exactly the same as the corresponding and respective space vehicle unit 180 and its first end 182, second end 184, boost protective cover, shroud or fairing 186, first stage unit 187, at least one first stage unit motor or engine 188, second stage unit 189, at least one second stage unit motor or engine 191, at least one containing structure motor or engine 192, service module 193, and interstage unit 195 of the first embodiment as described above.

Preferably, the containing structure 290 and its top 294, bottom 296, body 298, and periphery 299 of body 298 of this embodiment, are substantially similar to or exactly the same as the corresponding and respective containing structure 190 and its top 194, bottom 196, body 198, and periphery 199 of body 198 of the first embodiment as described above.

In use and similar to the timeline as shown in FIG. 4, it is preferred that one or more throttleable motors 270, engine fairing 272, fairing 286, first stage unit 287, motor 288, second stage unit 289, motor 291, and interstage unit 295 are releasably jettisoned from the containing structure 290, motor 292, and service module 293 when a predetermined altitude is reached during a flight. This is done because these devices and/or components are no longer needed or necessary for the rest of the flight trip, and releasing them from the containing structure 290, motor 292, and service module 293 would help to reduce weight and save fuel and costs.

Figure 7:
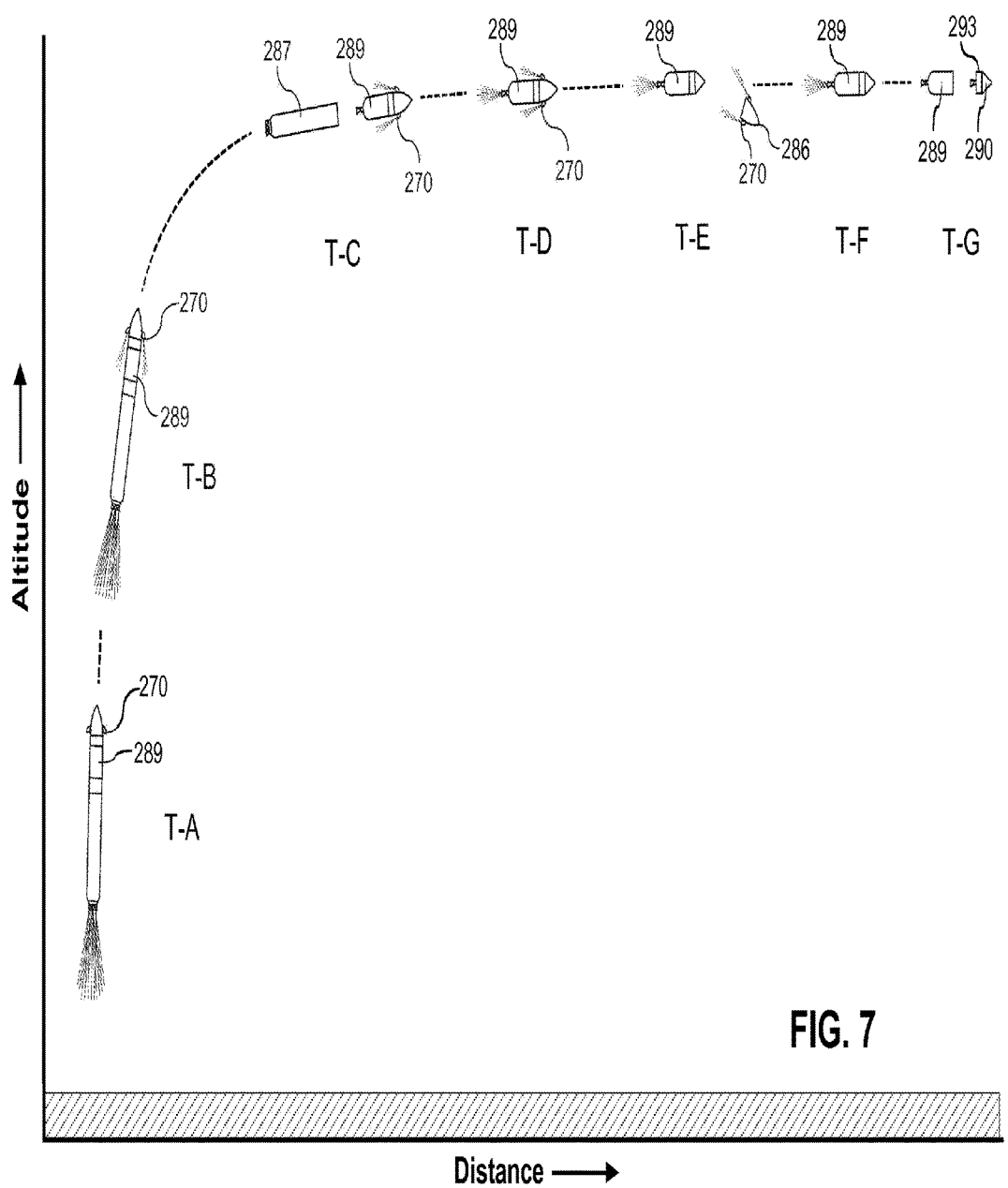
FIG. 7 is a schematic review of a timeline, showing different stages of a launch, a flight, and a jettisoning of devices and components, of the throttleable propulsion launch escape system of FIG. 5.
Figure 8:
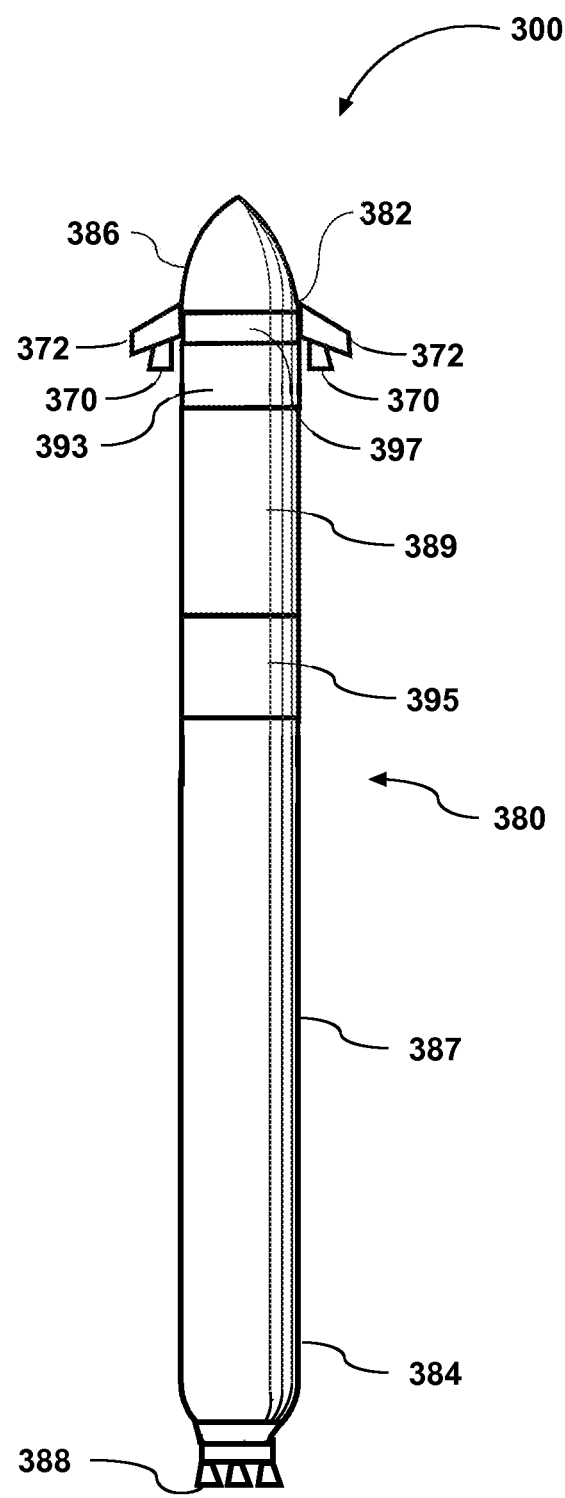
FIG. 8 is a front, perspective view of a third embodiment of the throttleable propulsion launch escape system according to the present invention.
Figure 9A:
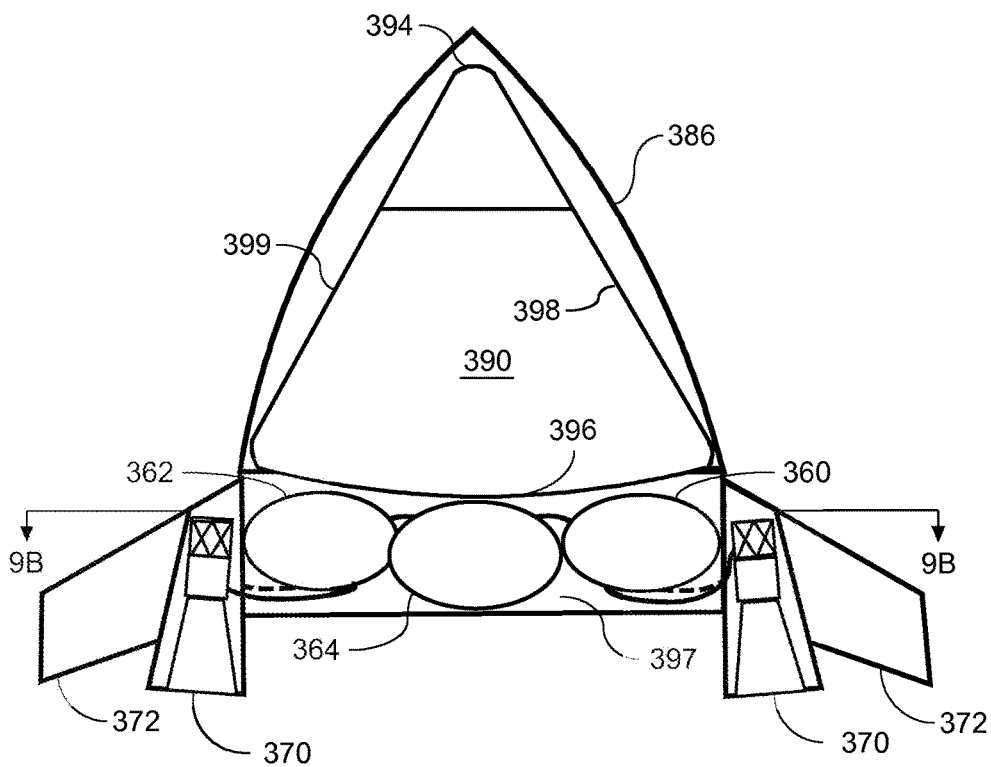
FIG. 9A is a schematic, cut-away view, from top to bottom, of a fairing, containing structure and boost escape system of the throttleable propulsion launch escape system of FIG. 8, showing examples of internal devices and components being secured or attached to, and/or contained within, the boost escape system.
Figure 9B:
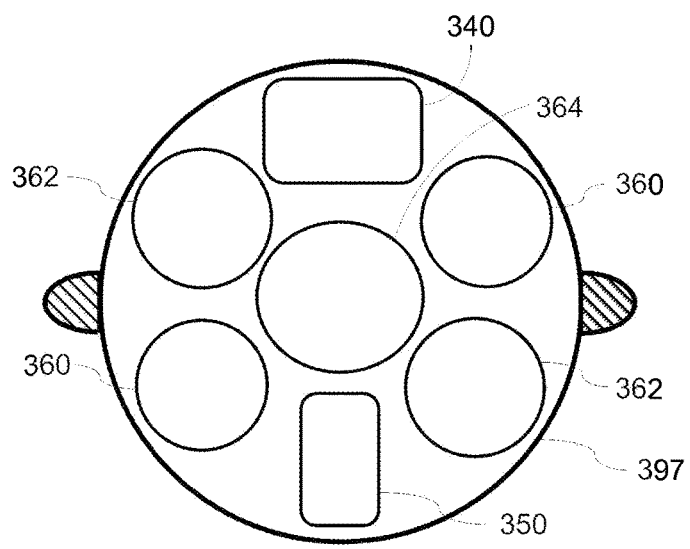
FIG. 9B is a schematic, cross-sectional view of the boost escape system of the throttleable propulsion launch escape system of FIG. 8, showing examples of internal devices and components being secured or attached to, and/or contained within, the boost escape system.
Figure 10:
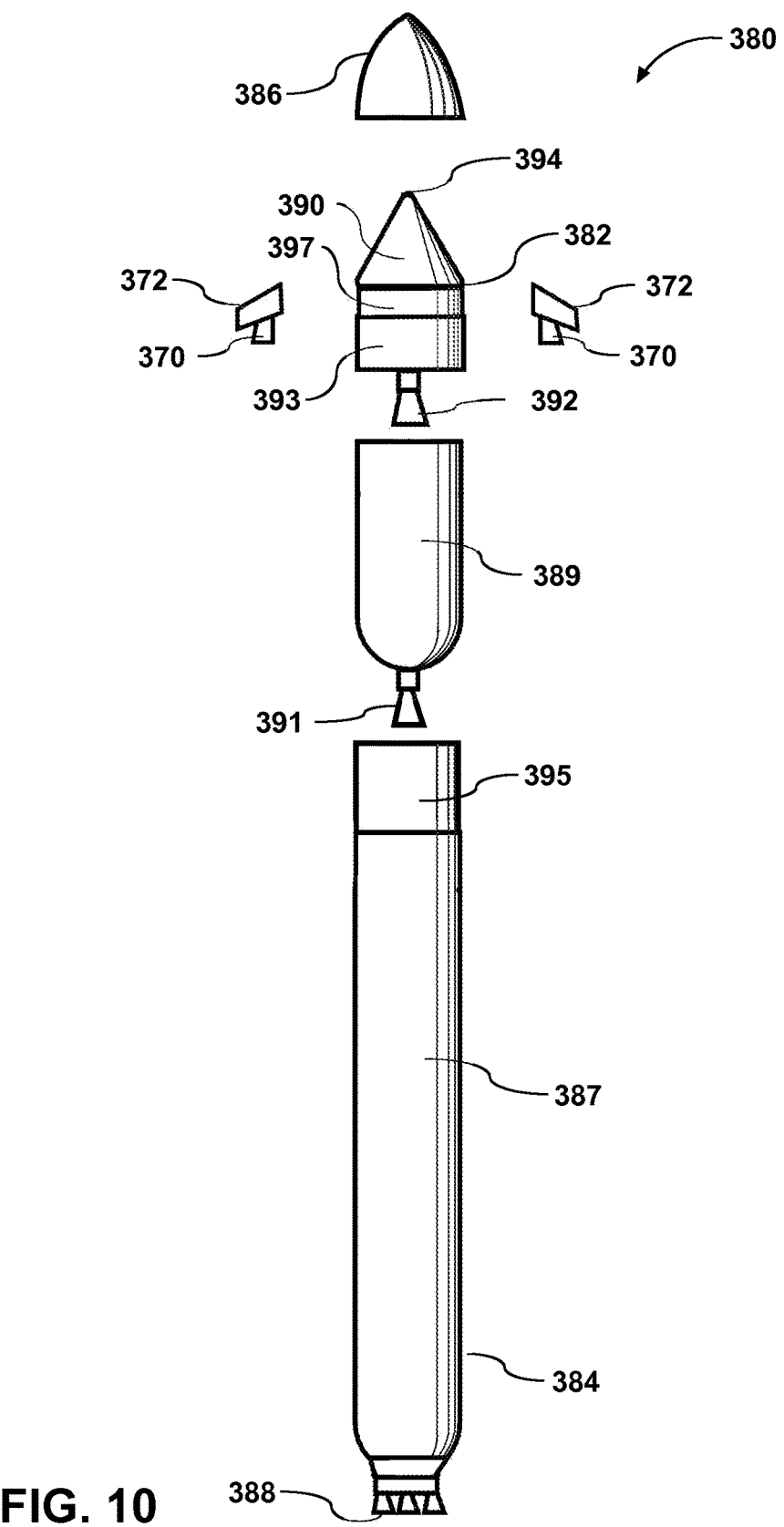
FIG. 10 is an exploded view of the throttleable propulsion launch escape system of FIG. 8.

FIG. 7 shows a schematic review of a timeline, illustrating different stages of a launch, a flight, and a jettisoning of devices and/or components, of this embodiment of the throttleable propulsion launch escape system:

Time-0 (not shown): space vehicle stack, which includes fairing 286, first stage unit 287, motor 288, second stage unit 289, motor 291, containing structure 290, motor 292, service module 293, interstage unit 295, engine fairing 272, and throttleable motors 270, is on the ground; Time-A: space vehicle stack is in powered flight; Time-B: space vehicle stack, with throttleable motors 270 at low power operation; Time-C: first stage unit 287, motor 288, and interstage unit 295 are separated from remaining space vehicle stack, with throttleable motors 270 at low power operation; Time-D: fairing 286, second stage unit 289, motor 291, containing structure 290, motor 292, service module 293, engine fairing 272, and throttleable motors 270 are flying, with throttleable motors 270 running at low power; Time-E: throttleable motors 270, engine fairing 272, and fairing 286 are jettisoned from remaining space vehicle stack of second stage unit 289, motor 291, containing structure 290, motor 292, and service module 293; Time-F: second stage unit 289, motor 291, containing structure 290, motor 292, and service module 293 are flying; and Time-G: second stage unit 289 and motor 291 are separated from containing structure 290, motor 292, and service module 293.

In a further embodiment and referring to FIGS. 8-11, the TPLES 300 includes a space vehicle unit 380 that includes a containing structure 390, and at least one throttleable motor or engine 370 being detachably or releasably secured or attached about, proximate or to a boost escape system 397 located below the containing structure 390. The TPLES 300 of this embodiment may further include one or more of the following: a propellant source and one or more instrumentation devices 340, 350.

When the TPLES 300 includes one or more throttleable motors 370, it is preferred that the throttleable motors 370 are detachably or releasably secured or attached about or toward the first end 382 of the space vehicle unit 380. In this embodiment, the throttleable motor 370 and wings 372 are detachably or releasably secured or attached to the boost escape system 397 by any method known to one of ordinary skill in the art. Preferably, each throttleable motor 370 is positioned at a predetermined angle such that the exhaust from the throttleable motor 370 does not make contact with, or makes minimum contact with, nor impinge the service module 393 or second stage unit 389, or any surface of the space vehicle unit 380.

Preferably, the instrument unit 340 of this embodiment is substantially similar to or exactly the same as the instrument unit 140, 240 of the other embodiments as described above.

Preferably, the G, N and C unit 350 of this embodiment is substantially similar to or exactly the same as the G, N and C unit 150, 250 of the other embodiments as described above.

Preferably, the propellant source, tanks 360, 362, and other related components of this embodiment are substantially similar to or exactly the same as the corresponding and respective propellant source, tanks 160, 260, 162, 262 and other related components of the other embodiments as described above.

Preferably, the propellant pressurizing source and propellant pressurizing tank 364 of this embodiment are substantially similar to or exactly the same as the corresponding and respective propellant pressurizing source and propellant pressurizing tank 164, 264 of the other embodiments as described above.

Preferably, the throttleable motor or engine 370 of this embodiment is substantially similar to or exactly the same as the throttleable motor or engine 170, 270 of the other embodiments as described above.

Excluding the boost escape system 397, preferably, the space vehicle unit 380 and its first end 382, second end 384, boost protective cover, shroud or fairing 386, first stage unit 387, at least one first stage unit motor or engine 388, second stage unit 389, at least one second stage unit motor or engine 391, at least one containing structure motor or engine 392, service module 393, and interstage unit 395 of this embodiment, are substantially similar to or exactly the same as the corresponding and respective space vehicle unit 180, 280 and its first end 182, 282, second end 184, 284, boost protective cover, shroud or fairing 186, 286, first stage unit 187, 287, at least one first stage unit motor or engine 188, 288, second stage unit 189, 289, at least one second stage unit motor or engine 191, 291, at least one containing structure motor or engine 192, 292, service module 193, 293, and interstage unit 195, 295 of the other embodiments as described above.

Preferably, the containing structure 390 and its top 394, bottom 396, body 398, and periphery 399 of body 398 of this embodiment, are substantially similar to or exactly the same as the corresponding and respective containing structure 190, 290 and its top 194, 294, bottom 196, 296, body 198, 298, and periphery 199, 299 of body 198, 298 of the other embodiments as described above.

In use and similar to the timelines as shown in FIGS. 4 and 7, it is preferred that one or more throttleable motors 370, wings 372, fairing 386, first stage unit 387, motor 388, second stage unit 389, motor 391, and interstage unit 395, are releasably jettisoned from the containing structure 390, motor 392, service module 393, and boost escape system 397 when a predetermined altitude is reached during a flight. This is done because these devices and/or components are no longer needed or necessary for the rest of the flight trip, and releasing them from the containing structure 390, motor 392, service module 393, and boost escape system 397 would help to reduce weight and save fuel and costs.

Figure 11:
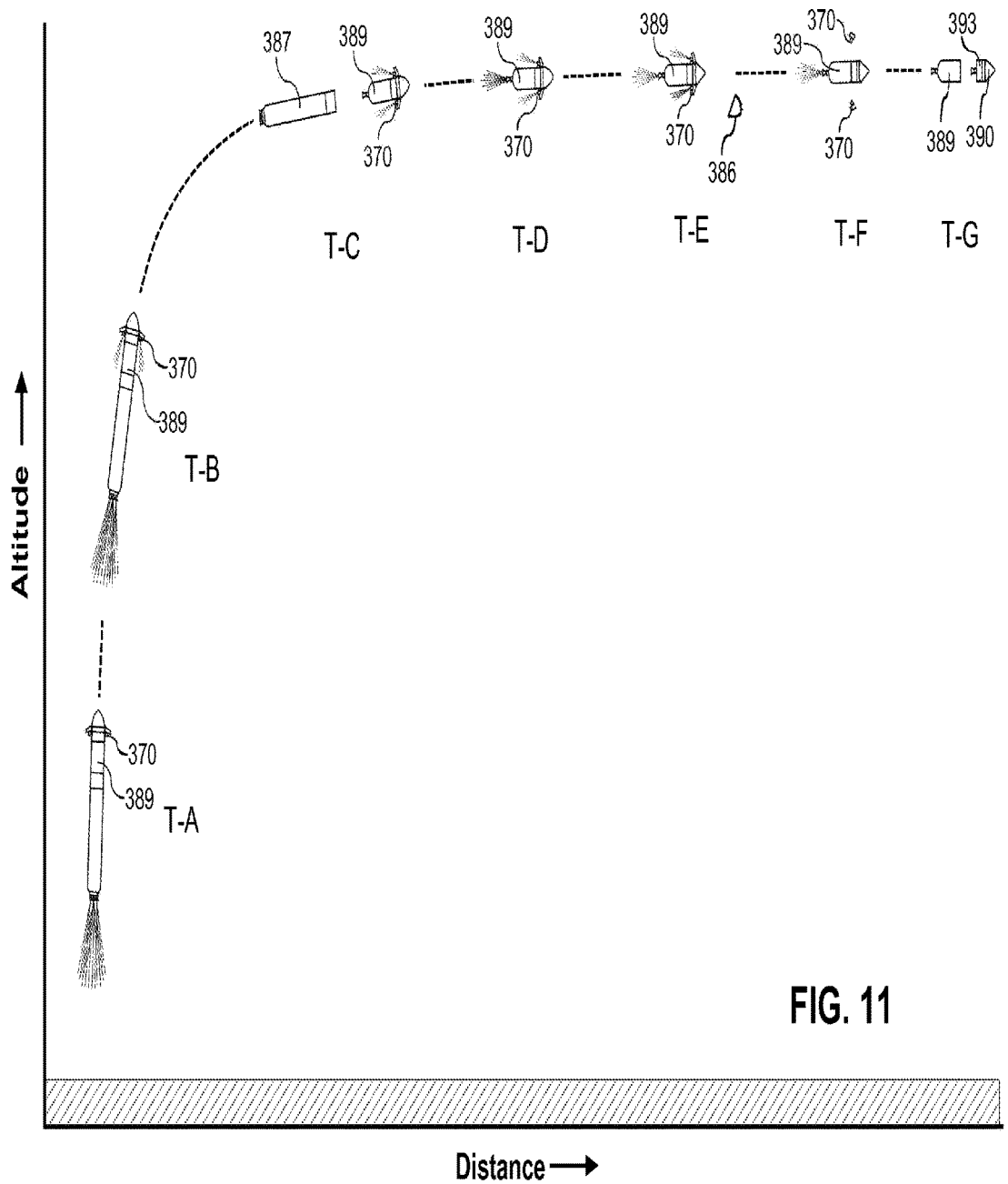
FIG. 11 is a schematic review of a timeline, showing different stages of a launch, a flight, and a jettisoning of devices and components, of the throttleable propulsion launch escape system of FIG. 8.

FIG. 11 shows a schematic review of a timeline, illustrating different stages of a launch, a flight, and a jettisoning of devices and/or components, of this embodiment of the throttleable propulsion launch escape system:

Time-0 (not shown): space vehicle stack, which includes fairing 386, first stage unit 387, motor 388, second stage unit 389, containing structure 390, motor 391, motor 392, service module 393, interstage unit 395, boost escape system 397, throttleable motors 370, and wings 372, is on the ground; Time-A: space vehicle stack is in powered flight; Time-B: space vehicle stack, with throttleable motors 370 at low power operation; Time-C: first stage unit 387, motor 388, and interstage unit 395 are separated from remaining space vehicle stack, with throttleable motors 370 at low power operation; Time-D: throttleable motors 370, wings 372, fairing 386, second stage unit 389, containing structure 390, motor 391, motor 392, service module 393, and boost escape system 397, are flying, with throttleable motors 370 running at low power; Time-E: fairing 386 is jettisoned from remaining space vehicle stack of throttleable motors 370, wings 372, second stage unit 389, containing structure 390, motor 391, motor 392, service module 393, and boost escape system 397; Time-F: throttleable motors 370 and wings 372 are jettisoned from remaining space vehicle stack of second stage unit 389, containing structure 390, motor 391, motor 392, service module 393, and boost escape system 397; Time-G: second stage unit 389 and motor 391 are separated from containing structure 390, motor 392, service module 393, and boost escape system 397.

Figure 12A:
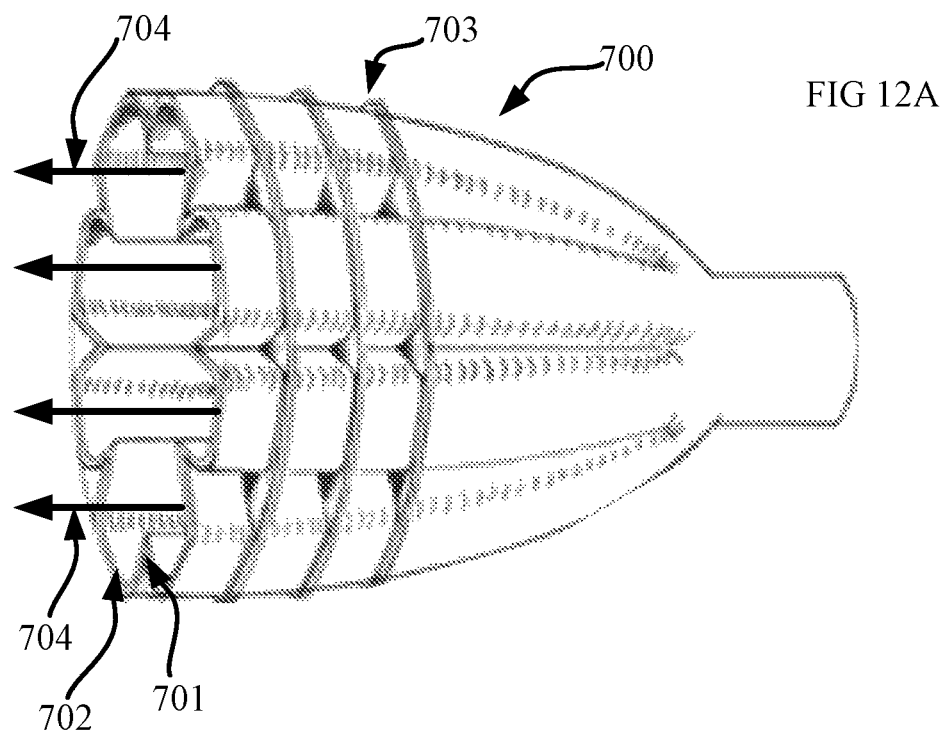
FIG. 12A is an oblique view of a three-dimensional nozzle according to the present invention, showing diverging section waves and scallops and reinforcing rings.
Figure 12:
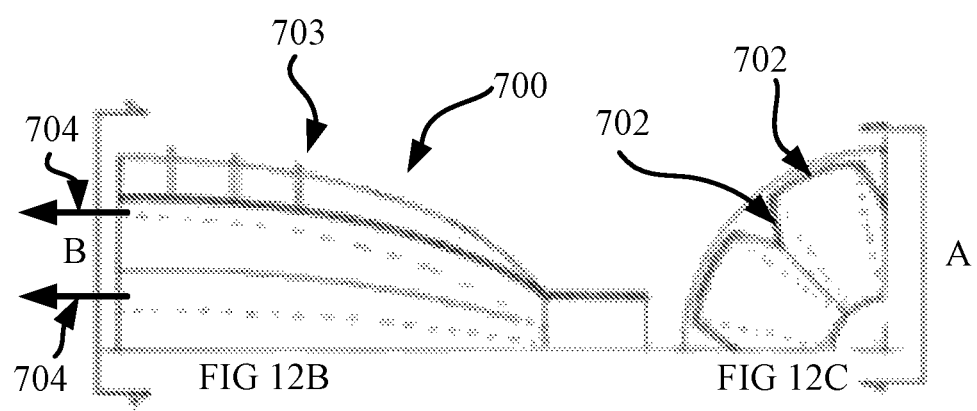
FIG. 12B is a cut-away, side view of the three-dimensional nozzle of FIG. 12A.
FIG. 12C is a partial view of the three-dimensional nozzle of FIG. 12A, looking into an exit plane.

Referring to FIG. 12, an additional embodiment of the present invention is a three-dimensional (3-D) nozzle 700.

A de Laval nozzle 600, as shown in FIG. 13, or convergent-divergent nozzle, CD nozzle or con-di nozzle, is a tube that is pinched in the middle or throat 601, making a carefully balanced, asymmetric hourglass-shape. It is used to accelerate a hot, pressurized gas passing through it to a supersonic speed, and upon expansion, to shape the exhaust flow out of the diverging section or exit plane 602 so that the heat energy propelling the flow is maximally converted into directed kinetic energy. Because of this, the nozzle 600 is widely used in some types of steam turbines, it is an essential part of the modern rocket engine, and it also sees use in supersonic jet engines.

Its operation relies on the different properties of gases flowing at subsonic and supersonic speeds. The speed of a subsonic flow of gas will increase if the pipe carrying it narrows because the mass flow rate is constant. The gas flow through a de Laval nozzle is isentropic (gas entropy is nearly constant). At subsonic flow the gas is compressible; sound, a small pressure wave, will propagate through it. At the throat or middle 601 where the cross sectional area is a minimum, the gas velocity locally becomes sonic (Mach number=1.0), a condition called choked flow. As the cross sectional area of the nozzle 600 increases, the gas begins to expand and the gas flow increases to supersonic velocities where a sound wave will not propagate backwards through the gas as viewed in the frame of reference of the nozzle 600 (Mach number>1.0).

A de Laval nozzle will only choke at the throat if the pressure and mass flow through the nozzle is sufficient to reach sonic speeds, otherwise no supersonic flow is achieved and it will act as a Venturi tube; this requires the entry pressure to the nozzle to be significantly above ambient at all times (equivalently, the stagnation pressure of the jet must be above ambient).

In addition, the pressure of the gas at the exit of the expansion portion of the exhaust of a nozzle must not be too low. Because pressure cannot travel upstream through the supersonic flow, the exit pressure can be significantly below ambient pressure it exhausts into, but if it is too far below ambient, then the flow will cease to be supersonic, or the flow will separate within the expansion portion of the nozzle, forming an unstable jet that may "flop" around within the nozzle, possibly damaging it.

In practice ambient pressure must be no higher than roughly 2-3 times the pressure in the supersonic gas at the exit for supersonic flow to leave the nozzle.

Conventional Laval nozzles have always been axi-symmetric in nature, being designed as cones or bells in the diverging section or exit plane 602.

It is Applicant's belief that the actual gas flow 704 is 3-dimensional and that a nozzle that is shaped in accordance with the trajectory optimized flow condition can avoid the unstable flow conditions and increase performance by reducing the pressure at the exit plane. Hence, a 3-D nozzle, 700 will have significantly higher efficiency. This is achieved by reverse engineering the shape of the nozzle to the flow conditions at all points in flight or by allowing the nozzle to mechanically adjust during operation in the divergent section. Essentially, a series of scallops or waves designed into the nozzle 700, as shown in FIG. 12, will improve the operating performance of the nozzle 700.

Applicant believes a trajectory averaged solution can be designed which provides a trajectory averaged performance higher then the design point specific performance of an axi-symmetric nozzle 600 much as lobed mixers have improved performance for subsonic turbine engine exhausts.

This 3-D nozzle 700 would have strong performance improvements on tactical missiles (such as, but not limited to, ground to air, air to air, air to ground, and ship to shore), or on space launch first stages or ground launched reusable flight vehicles.

An embodiment would take a nozzle 700 above and place a series of designed ridges 701 and curves 702 to match pressure variation in the flow field 704 in such a way as to eliminate instability when the external pressure is changing.

Some non-limiting examples or description of the 3-D nozzle 700 of the present invention are:

1) the exit cone of a rocket nozzle 700 where engineered curves, ripples, waves, bubbles 701, 702 are placed in such a manner as to improve the behavior of the nozzle 700 when placed in a varying external pressure environment; 2) the reinforcement of such nozzle 700 by a series of rings, ribs, or chemically removed areas 703; and 3) the cooling of the ribs and waffles by active fluid piped along the outside.

It is to be understood that the present invention is not limited to the embodiments described above or as shown in the attached figures, but encompasses any and all embodiments within the spirit of the invention.

A three-dimensional nozzle 700 comprising a metal structure comprised of a pinched tube where there is a divergent section and a convergent section, wherein said convergent section is described as a throat, and wherein said divergent section comprises a series of waves, ridges or scallops 701, 702 being placed normal to a flow field 704 but in such a manner as to entrain oscillating or rotating pressure instabilities so as to stabilize gas flow 704 in atmospheric conditions.

The three-dimensional nozzle 700 wherein said divergent section comprises a series of waves, ridges or scallops 701, 702 being placed normal to a flow field 704 but in such a manner as to entrain oscillating or rotating pressure instabilities so as to stabilize gas flow 704 in atmospheric conditions so as to control stream wise vorticity within exiting flow field 704.

The invention claimed is:

1. A three-dimensional nozzle for a thrust producing engine, said three-dimensional nozzle comprising:
a pinched tube comprising a converging section, a throat downstream of said converging section, and a diverging section downstream of said throat, wherein said throat has a smallest cross-section for downstream flow through said pinched tube, wherein said throat is in fluid communication with a combustion chamber;
wherein said pinched tube is further configured such that a gas flow, which is a choked flow at said throat, will be a subsonic flow within said converging section, and a supersonic flow at an exit plane of said divergent section,
said diverging section further comprising an alternating series of curves and ridges positioned on an inner surface of said diverging section,
a series of valleys comprising an outer surface portion of said diverging section, wherein each valley of said series of valleys is centered on a respective ridge of said alternating series of curves and ridges and further comprises part of said outer surface corresponding to a respective pair of curves, connected to said respective ridge, among said alternating series of curves and ridges; and
at least one restrictor configured to prevent fluid flow through said series of valleys from reaching said supersonic flow,
said restrictor comprising at least one ring, said at least one ring comprising a first ring portion radially outward from said diverging section, wherein said first ring portion circumscribes said diverging section, said at least one ring further comprising a second ring portion extending radially inward from said first ring portion to said outer surface portion.

2. The three-dimensional nozzle according to claim 1, wherein said diverging section is an exit cone of said three-dimensional nozzle.

3. The three-dimensional nozzle according to claim 1, wherein said diverging section comprises a bell shape from said throat to said exit plane and wherein each curve and ridge of said alternating series of curves and ridges follows a respective arc along said bell shape.

4. The three-dimensional nozzle according to claim 1, wherein an exit plane diameter measured at said exit plane between radially opposite ridges among said alternating series of curves and ridges is at least two times greater than a throat diameter measured at a downstream end of said throat.

5. The three-dimensional nozzle according to claim 1, wherein said three-dimensional nozzle is reinforced by said at least one ring.

6. The three-dimensional nozzle according to claim 5, wherein said at least one ring is positioned to resist pressure from an interior of said diverging section.

7. The three-dimensional nozzle according to claim 5, wherein said at least one ring comprises a plurality of rings.

* * * * *